United States Patent
Sawkins

[19]

[11] Patent Number: 5,942,071
[45] Date of Patent: Aug. 24, 1999

[54] METHOD OF MANUFACTURE OF FLEXIBLE TUBE CONTAINERS

[75] Inventor: John D. Sawkins, Essex, United Kingdom

[73] Assignee: Courtaulds Packaging Limited, Essex, United Kingdom

[21] Appl. No.: 08/981,608

[22] PCT Filed: Jun. 28, 1996

[86] PCT No.: PCT/GB96/01575

§ 371 Date: Jan. 29, 1998

§ 102(e) Date: Jan. 29, 1998

[87] PCT Pub. No.: WO97/01430

PCT Pub. Date: Jan. 16, 1997

[30] Foreign Application Priority Data

Jun. 29, 1995 [GB] United Kingdom .................... 9513265
Nov. 14, 1995 [GB] United Kingdom .................... 9523265

[51] Int. Cl.⁶ .................................................. B29C 53/08
[52] U.S. Cl. ......................... 156/198; 156/201; 156/203; 156/465; 156/466
[58] Field of Search .................................... 156/443, 459, 156/461, 465, 466, 555, 198, 201, 203, 227

[56] References Cited

U.S. PATENT DOCUMENTS

| | | | |
|---|---|---|---|
| 3,260,410 | 7/1966 | Brandt et al. ........................... | 222/107 |
| 3,504,067 | 3/1970 | Trecek ..................................... | 264/408 |
| 3,946,905 | 3/1976 | Cogliano ................................. | 222/107 |
| 5,318,203 | 6/1994 | Iaia et al. ................................. | 222/94 |

FOREIGN PATENT DOCUMENTS

| | | |
|---|---|---|
| A 0 465 391 | 1/1992 | European Pat. Off. . |
| A 2 202 772 | 5/1974 | France . |
| A 2 395 288 | 10/1976 | France . |
| A 2 608 502 | 6/1988 | France . |
| A 28 49 196 | 5/1980 | Germany . |
| A 42 13 285 | 10/1993 | Germany . |
| A 1 110 351 | 4/1968 | United Kingdom . |
| A 2 251 472 | 7/1992 | United Kingdom . |

OTHER PUBLICATIONS

Patent Abstracts of Japan, vol. 009, No. 158 (M–393), Jul. 3, 1985 & JP,A,50 031943 (Daiwa Shoji:KK), Feb. 18, 1985.

*Primary Examiner*—James Sells
*Attorney, Agent, or Firm*—Nixon & Vanderhye P.C.

[57] ABSTRACT

A method of manufacture of a shaped flexible tube container, typically having a square or "D" section tube, from a flexible plastic tube (15) of substantially round cross section, in which longitudinally extending creases (31, 32) are formed in the wall of the tube by a creasing means (16, 17) acting on the external surface of the tube. The creasing means preferably comprise at least air of rollers (16 or 17) and the tube passes between the two rollers.

27 Claims, 5 Drawing Sheets

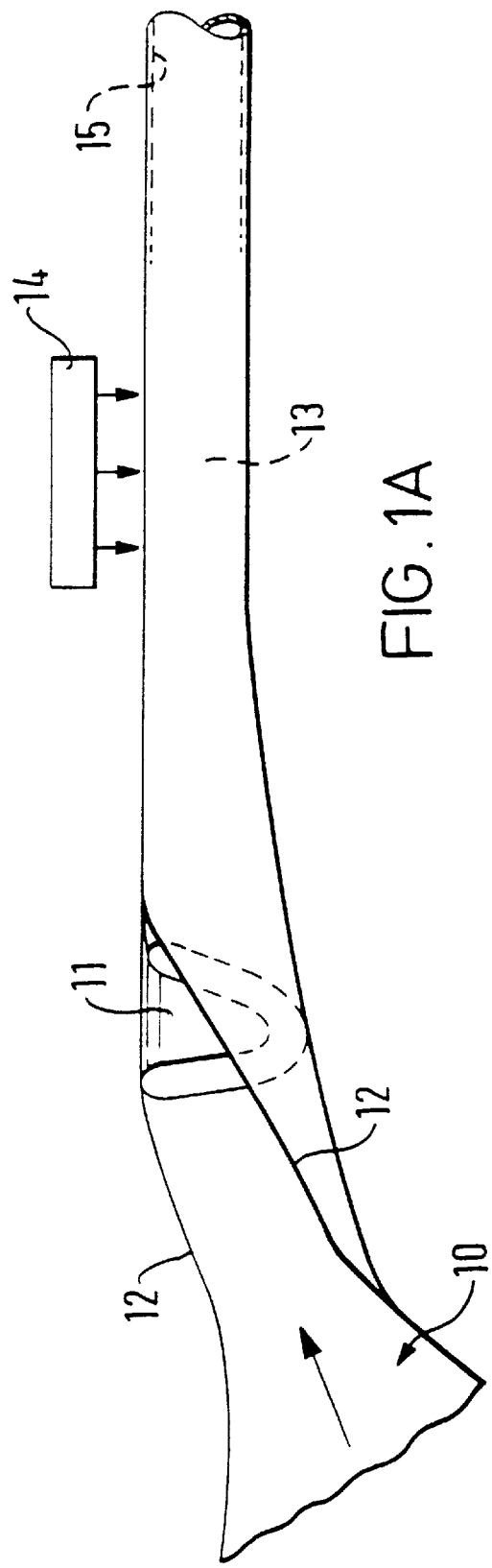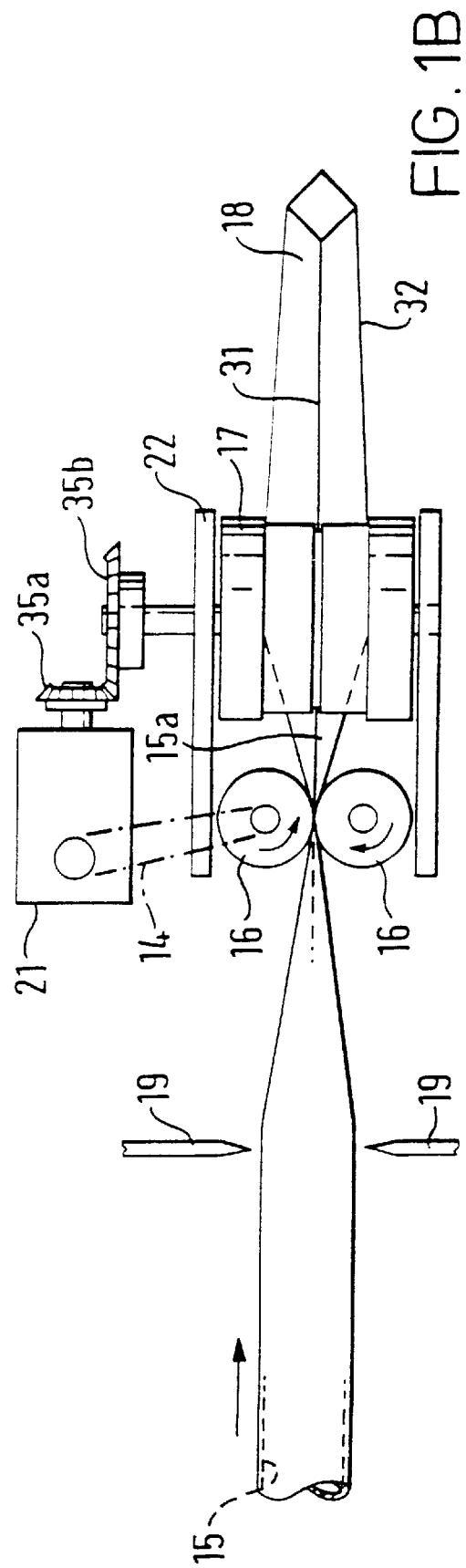

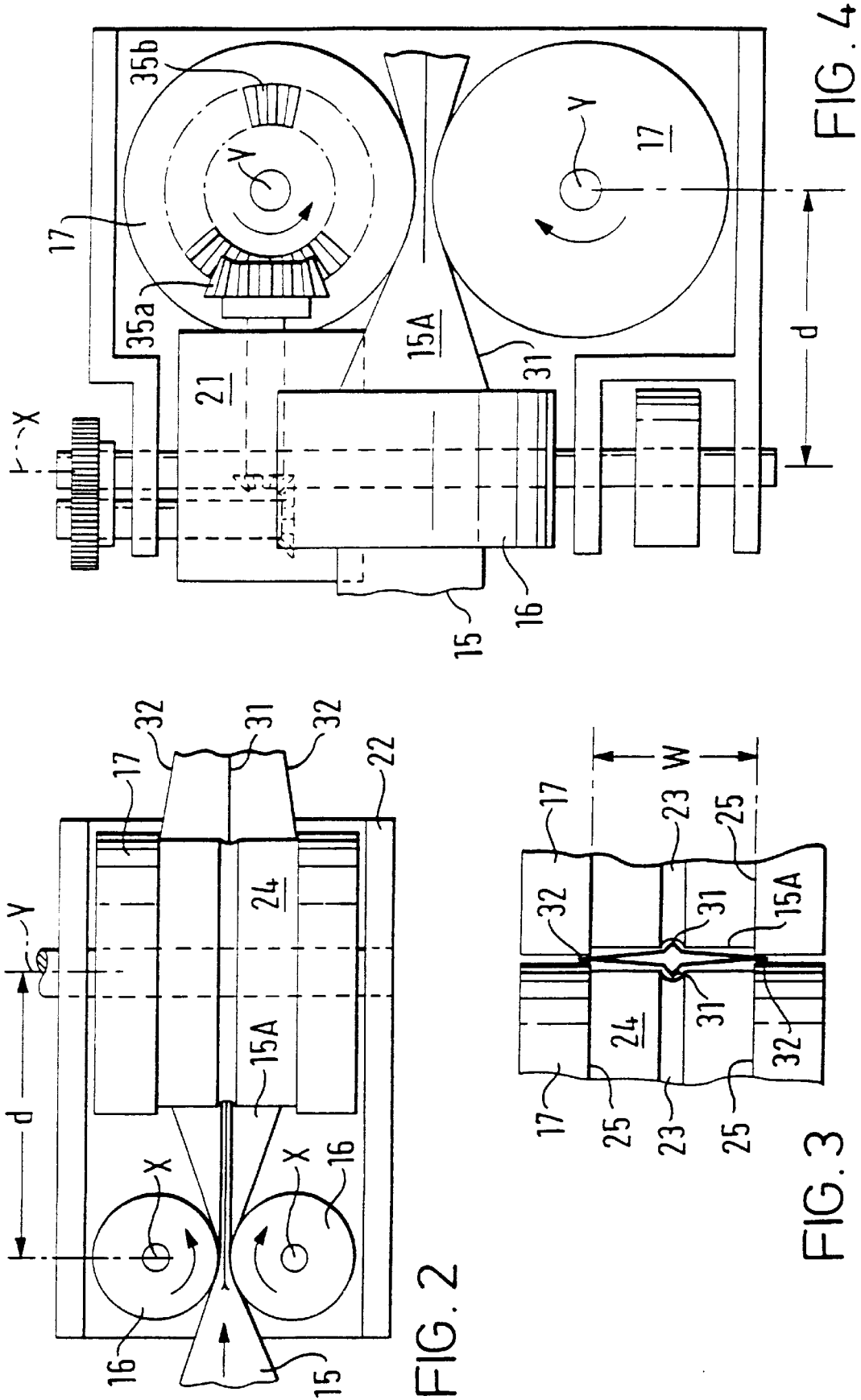

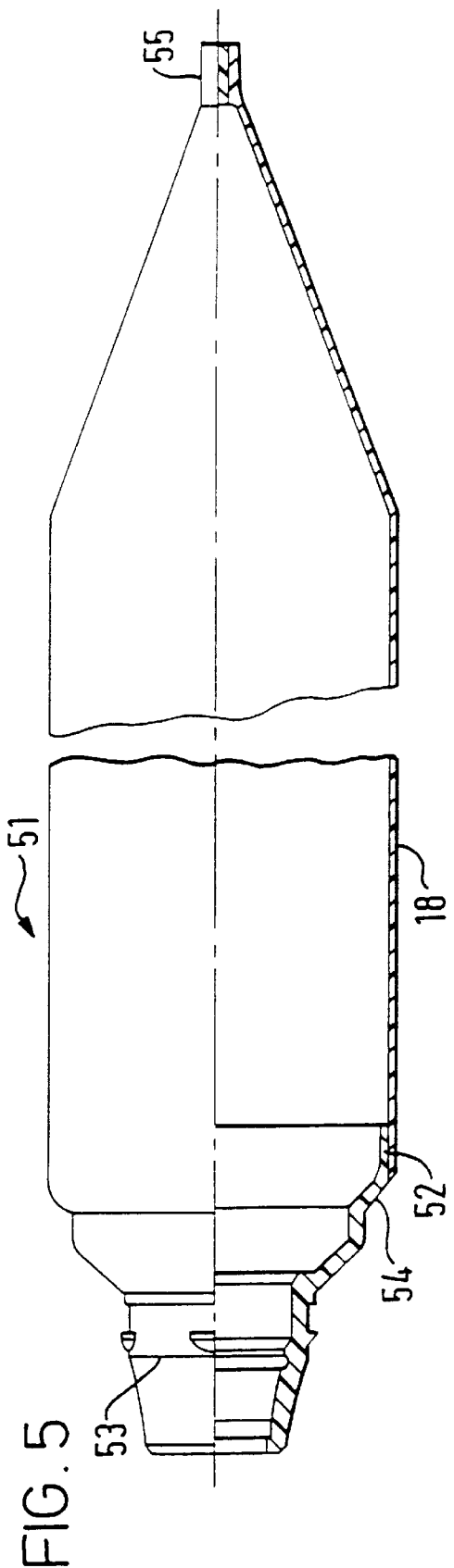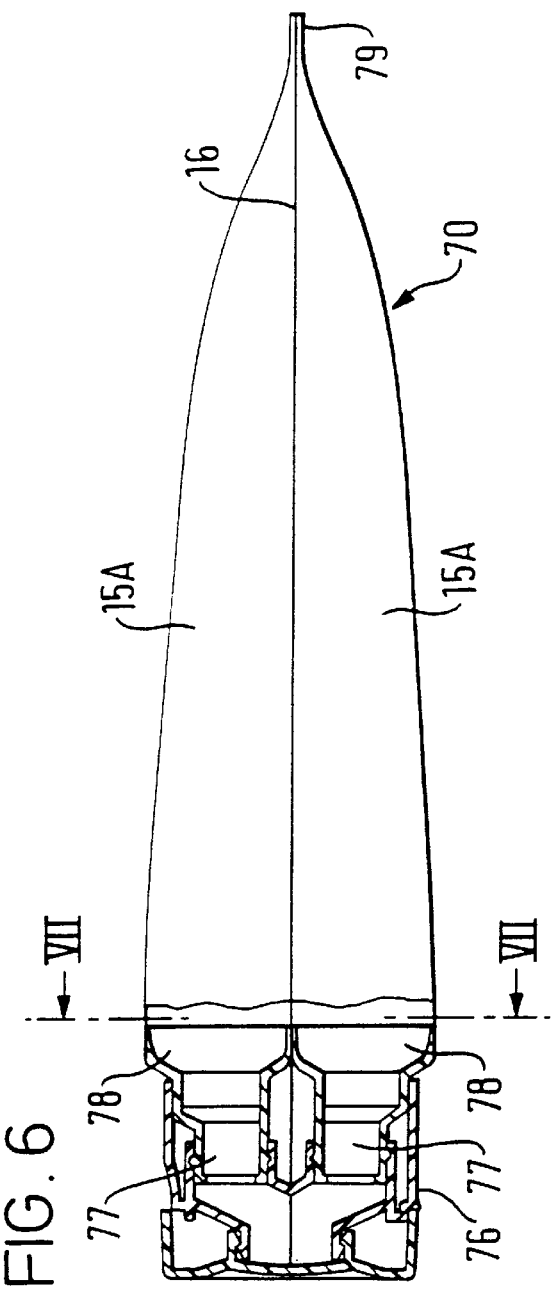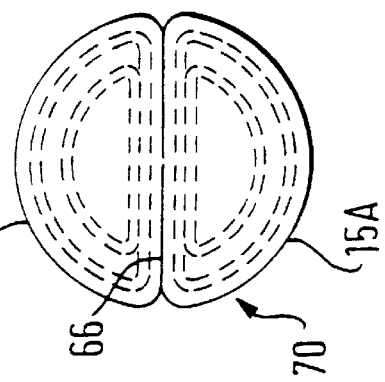

METHOD OF MANUFACTURE OF FLEXIBLE TUBE CONTAINERS

BACKGROUND OF THE INVENTION

1. Field of the Invention

This invention relates to a method of manufacture of flexible tube containers, in particular plastics tube containers, and especially plastics tube containers of the type used for dispensing flowable materials such as, for example, toothpaste, cosmetic creams or edible pastes.

2. Discussion of Prior Art

A typical plastics paste tube container is made by shaping a flat plastics strip so that the longitudinal edges of the strip are brought into contact and welded together as the strip is advanced. The tube formed in this manner is typically substantially round or oval in cross-section, with one end being subsequently closed by a cap with a nozzle therein, and the other end being formed into a "fish tail" sealed end.

Such tubes are generally marketed in cartons for protection, ease of storage in boxes and for convenient display on shelves.

More recently there has been a development as illustrated in U.S. Pat. No. 5,299,689 to produce tube containers of square cross-section in order to avoid the need for an external carton. Square cross-section tube containers may be made by blow moulding techniques as shown in U.S. Pat. No. 5,299,689 or U.S. Pat. No. 5,383,577. Alternatively, U.S. Pat. No. 5,373,965 discloses a method of manufacturing tubes of square cross-section by a folding operation or by direct extrusion of square section tubular material.

Also dual chamber dispensing containers have been developed for the separate storage of components which interact when allowed to combine, the two components being combined on discharge from the container. Examples of such containers are shown in U.S. Pat. No. 5,328,056, U.S. Pat. No. 5,318,203, U.S. Pat. No. 4,528,180 and WO 94/19251.

Dual chamber flexible dispensing containers may comprise two independent tubular containers held in side-by-side relationship as shown in U.S. Pat. No. 4,528,180, U.S. Pat. No. 5,318,203 and WO 94/19251. In order to assemble the tubular containers side-by-side, the upper ends of the two containers formed into a D-shaped cross-section are provided with a D-shaped fitting, sometimes known as a shoulder, allowing the two containers to be held side-by-side and form a circular configuration which may be held together within a cylindrical cap. The prior art tubular containers shown in U.S. Pat. No. 5,318,203 and WO 94/19251 are generally made from tube of circular cross-section and are each deformed at one end to take up the D-shaped configuration whilst the remainder of the tubular compartment is substantially circular. After filling and formation of the 'fish tail' sealed ends there is typically a graduation in the shape of the tubular container from the D-shaped cross-section end through an oval cross-section to the substantially flat tail end format.

SUMMARY OF THE INVENTION

The present invention provides a method of manufacture of square and 'D' shaped flexible containers which is easily adaptable to existing manufacturing techniques in which tube containers can be formed from flat plastics strip or web.

According to the invention there is provided a method of manufacture of a shaped flexible tubular container in which a flexible plastics tube of substantially round cross-section has at least one longitudinally extending crease formed in the wall of the tube by means acting on the external surface so the tube.

Preferably at least one crease is formed by passing the tube through a pair of rollers.

Alternatively the tube may be passed through a shaped die having acute angles therein and creases are formed as the tube deforms on passing through the die. In yet another method, the tube may have creases formed in its wall as it passes over a mandrel by compressing portions of the tube against a non-circular portion of the mandrel.

Such methods are suitable for making D-shaped cross-section tubes of substantially constant cross-section with a pair of longitudinally extending creases having a flat planar portion formed therebetween on one side of the tube.

Such a method is particularly suitable for the manufacture of D-shaped tubes from multi-layered or laminate plastics strip of the type used for the manufacture of toothpaste tubes.

Preferably where said method is for the manufacture of a flexible tube container of substantially polygonal section, a flexible plastics tube of substantially round cross-section is separately flattened in at least two planes to form longitudinal fold creases corresponding to the corners of the polygonal section.

In this specification the term "polygonal" means "n-sided" where n is an even number greater than 2.

A preferred polygon has four sides and its manufacture involves flattening in two mutually perpendicular planes. Particularly preferred is a square cross-section.

Preferably the tube passes continuously from being flattened in one plane to being flattened in a second plane, and the tube may be compressed further in the one plane than in the second plane.

A tube of substantially round cross-section may be extruded or may be formed from curling up a flat strip, the longitudinal edges of which strip are gradually brought together (e.g. into an overlapping seam) as the strip is advanced. Since the strip has a typical thickness of about 0.012" (0.30 mm) and is formed from a homogenous plastics material, or from a laminate of different materials not all of which need be plastics materials, it may not maintain a truly circular shape but may distort to an oval shape.

In the case of an extruded tube the wall thickness could be about 0.018" (0.45 mm)

One advantage of the use of the above type of tube is that the laminate strip may be printed prior to formation of the shaped tubes.

The formation of the longitudinal creases may be aided by longitudinally scoring the external surfaces of the tube where the creases are to be formed. In the case of the four sided tube, the tube may also have discontinuous longitudinally extending scores formed on the external surface of at least two sidewalls between their respective corners to aid collapse of the container sidewalls.

The invention also relates to apparatus for the conversion of a substantially round flexible tube to a shaped flexible tube having at least one longitudinally extending crease in the wall thereof, said apparatus comprising creasing means for acting on the external surface of the tube to form at least one longitudinally extending crease in the said surface.

For the manufacture of D-shaped tubes the creasing means may comprise at least one set of rollers, one roller having a recess in its outer surface shaped to receive the round tube and as least one other roller having a surface shaped to crease the wall of the tube between the two rollers.

For manufacture of a substantially polygonal cross-section tube from a substantially round cross-section tube, the creasing means comprises at least two spaced apart pairs of parallel rollers, between which the tube passes to be flattened, the axes of the one pair of rollers being aligned transverse to the axes of another pair of rollers. Suitably the axes of one pair are mutually perpendicular relative to the axes of the other pair.

To make a tube of rectangular cross-section, the rollers are preferably arranged with an upstream pair of substantially upright rollers and a downstream pair of substantially horizontal rollers.

The centre portion of each roller of the downstream pair can have a smaller diameter than the outer portions thereof, the centre portion having a width just less than the width of the flattened tube contacting it. The two downstream rollers may also have a groove formed therein which in use receives those edges of the flattened tube created by the advancing of the tube through the upstream pair of rollers.

Apparatus for forming a tube of rectangular cross-section may include scoring means for scoring the external surface of the tube to locate the creases and assist in the retention of the rectangular (e.g. square) shape, and the tube may be formed with continuous or non-continuous scores or creases in a pair of opposed sidewalls of the tube to assist in the forming of a sealed end. Such scoring or creases may be formed by means of the use of raised ribs or beads or bosses on the outer surfaces of the shaped rollers, or perhaps by the use of eccentric rollers.

Alternatively the creasing means may comprise a die having a plurality of acute angled corners, there being one corner per desired crease, and the creases are formed as the round tube distorts to pass through the die.

The die may comprise a crescent shaped die of a variable size and two longitudinally extending creases are formed in the tube wall at the points of the crescent as the tube advances through the die.

In yet another alternative the creasing means may comprise a mandrel having a portion of non-circular cross-sectional shape and over which the tube is advanced so that the tube completely surrounds the mandrel, and at least one roller having an axis of rotation spaced from the mandrel so that the outer surface of the roller compresses the advancing tube against portions of the mandrel.

For producing D-shaped tubes, the external surface of the roller has a convex arcuate form, and the aforementioned noncircular cross-sectional portion of the mandrel comprises a generally circular cross-sectional body with a concave recess aligned with the roller so that the tube is compressed against the apices formed between the concavity and the mandrel body, and the concavity forms a relief between these apices into which a portion of the tube can deform.

The invention also provides for a polygonal (usually square) cross-section tubular container made by a method, or on apparatus, according to the present invention.

BRIEF DESCRIPTION OF THE DRAWINGS

The invention will now be described, by way of examples, and with reference to the accompanying drawings in which:

FIG. 1A and 1B are schematic views showing the manufacture of square plastics tube from flat ribbon, FIG. 2 is a plan view of apparatus used for converting round tube to square tube, FIG. 3 is a partial view of the second pair of rollers shown in FIG. 2, FIG. 4 is a schematic side elevation of the apparatus shown in FIG. 2, FIG. 5 is a sectional view of a square cross-section container, FIG. 6 is a partly-sectioned side elevation of a dual chamber container formed from tubes made according to the present invention, FIG. 7 is a cross-section of the container of FIG. 6 taken on the line VII—VII.

DETAILED DISCUSSION OF PREFERRED EMBODIMENTS

Figure 8:
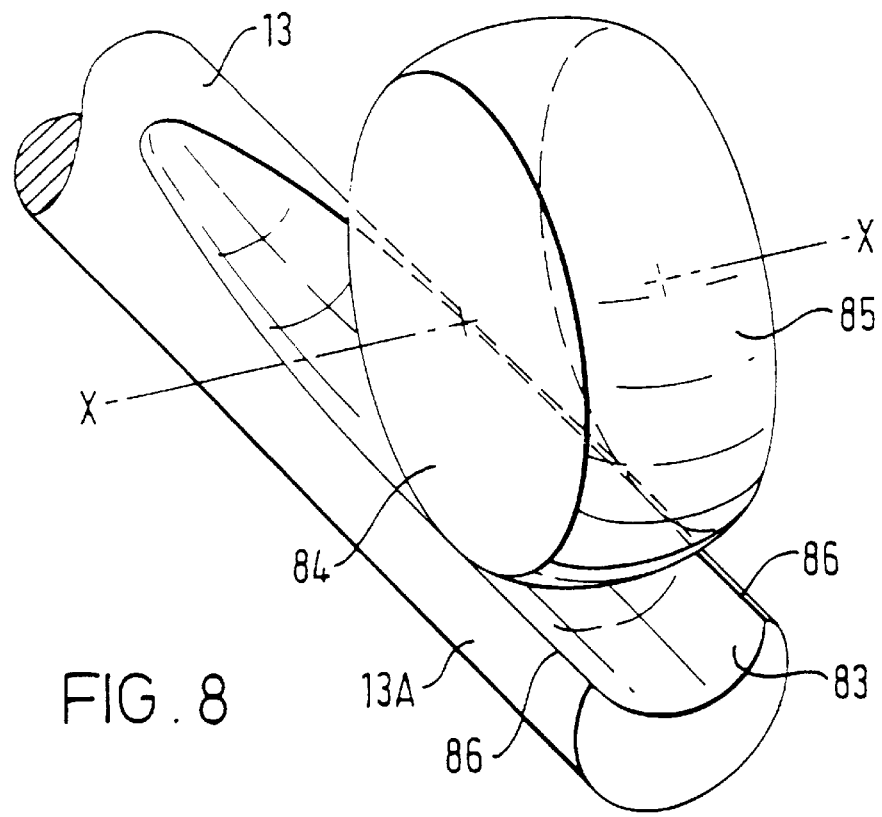
FIG. 8 shows a first apparatus for making a D-shaped tube from a round tube.

With reference to FIG. 1A there is shown in schematic form a process for the manufacture of circular cross-section toothpaste tubes from a flat flexible plastics strip 10 typically having a thickness of between 0.25 and 0.5 mm, but more typically in the range of 0.25 mm to 0.35 mm. The strip 10 is typically a laminate of several layers of different plastics materials including a vapour-impermeable barrier layer. The multi-layer strip may be laminated strip or co-extruded strip. The barrier layer may be a plastics material or a layer of metal (e.g. aluminium) foil.

The strip 10 is fed to a shaping funnel 11 which gradually brings opposite longitudinal edges 12 of the strip together with some overlap as the strip is advanced.

The rolled-up strip 10 then passes over a mandrel 13 and the overlapping edges are welded together using a high frequency welder 14. The thin walled round tube 15 formed thereby is next shamed into a desired cross-section flexible tube.

With reference to FIG. 1B the round cross-section tube 15 is formed into square cross-section tube 18 by separately flattening the tube 15 in two mutually perpendicular planes to form four folds or creases which correspond to the corners of the square tube 18. The round tube 15 is first passed through the nip formed between a first pair of rollers 16, each of which is arranged with its axis substantially vertical, and the tube then passes through the nip formed between a second pair of rollers 17 each of which is arranged with its axis substantially horizontal.

The tube 15 is cut to the required lengths necessary by knives 19. The knives 19 are arranged so that the cut end of a previous length of tube has engaged with the second set of rollers 17 before the knives sever that length from the continuous tube.

The two pairs of rollers 16, 17 are synchronously rotated by a motor 21 so that the rollers of both pairs have substantially the same linear surface speed. The drive to the rollers 16 is via a flexible endless drive member 14 and to the rollers 17 it is via meshing bevel gears 35a, 35b.

With reference now to FIGS. 2–4, the rollers 16 and 17 are shown mounted within a box-like body 22 with the axes "X" of the rollers 16 being perpendicular to the axes "Y" of the rollers 17.

The upstream pair of first rollers 16, which receive the round tube 15, are formed from any suitable material e.g. nylon. The gap defining the nip between the rollers 16 is smaller than the wall thickness of the tube, for example in this example the wall thickness of the tube is 0.35 mm (0.014") and the gap between the rollers 16 is 0.175 mm (0.007"). Each first roller 16 has a smaller diameter than each second roller 17, the diameter of the first rollers 16 being about 50 mm and the diameter of the second rollers 17 being about 100 mm.

The second pair of rollers 17 are formed from a suitable material such as nylon. The radially outer surface of each roller 17 is profiled and has a central annular groove 23 in the form of a "V" or a "U" which is about 6 mm (0.25") wide at its mouth. Each groove 23 is located in a reduced diameter portion 24 of the roller which has a width "W" just less than the overall width of the flattened tube. The shoulders 25 created between the two different diameter portions of the roller 17 have a height of between 1 and 2 mm.

The second pair of rollers 17 are spaced from the first pair of rollers 16 such that the minimum distances between the axes X of the first rollers 16 and axes Y of the second rollers 17 is about 3 times the diameter of the round tube 15. In this example the distance "d" is 100 mm (4 inches) for a 35 mm diameter tube 15. This allows for the tube to distort when it is passed continuously from the first rollers 16 to the second rollers 17. The minimum nominal gap between the second rollers 17 may be adjusted to suit the requirement of the crease to be formed and is preferably about 0.450 mm (0.018").

The rollers 16 and 17 are formed from a resilient material like nylon so that there is sufficient "give" in the rollers to accommodate the tube passing through gaps which are smaller than twice the wall thickness of the tube.

The round tube 15 is fed to the upstream first pair of contra-rotating rollers 16 to form a flattened tube 15A substantially lying in a single plane. As the flattened tube 15A emerges from the nip of the roller pair 16 it passes to the second pair of contra-rotating rollers 17. Because the vertical nip between the rollers 16 is aligned with the central grooves 23 of the rollers 17, corners 31 of the flattened tube 15A feed into the grooves 23 to locate the flattened tube symmetrically between the rollers 17. The contra-rotating rollers 17 then begin to drag the flattened tube 15A through the nip. At this moment when the tube is held by both pairs of rollers 16 and 17, the knives 19 cut the tube to leave a length, typically of about 15 cms.

As the flattened tube 15A passes through the second pair of rollers 17, the corners 31 are brought close together in the nip of the rollers 17 as shown in FIG. 3. The grooves 23 accommodate the corners 31 to ensure that the first creases creating the corners 31 are not smoothed out.

The smaller diameter central portions 24 of the rollers 17 accommodate most of the flattened tube 15A whilst the full load between the rollers 17 is applied to newly formed corners 32 of the tube 15A which are just located between the opposed larger diameter portions of the rollers 17. Thus, as the tube 15A passes through the apparatus, the tube 15A is compressed more highly when squeezed in the first plane than when squeezed in the second plane. This is because the second operation tends to reverse some of the deformations caused in the first operation.

The tube 15 is fed to the first rollers 16 such that the overlap seam is formed during the manufacture of the round tube 15 in a predetermined location and may be adjacent a corner of the square/rectangular tube 18 which will emerge from the second pair of rollers 17. This allows registration of any point of the strip relative to the shape of the final tube.

With the aligned grooves 23 located centrally in the rollers 17, the tube 18 formed is substantially square in cross-section.

The rotations of the pairs of rollers 16 and 17 may be synchronised by means of an adjustable belt drive 14 and the direct drive gears 35a, 35b shown in FIG. 1B, or by means of drive gear trains as shown in FIG. 4.

Each roller 16 or 17 may be formed from metal, such as stainless steel or bronze, if it is desired to use heated rollers during the tube-flattening process. In such instances it may be necessary for at least one roller in each pair to be spring-loaded to accommodate the material thickness of the flattened tube.

Although the process has been described with reference to the shaping of tube formed by rolling up flat strip, the process can be utilised for shaping of plastics tubes of round or oval cross-section formed by extrusion processes. An extruded tube may have a wall thickness of between 0.35 and 0.50 mm, but more typically has a wall thickness of about 0.45 mm.

By non-elastically flattening a tube of round cross-section successively in three different planes, a hexagonal cross-section may be obtained.

The round tube 15 can be scored, preferably to a depth of about 0.01 mm, at four equiangularly spaced locations around its periphery to accurately locate the creases or corners 31 of the square sectioned tube.

A typical square sectional flexible container 51 for toothpaste or the like, is shown in FIG. 5. The square section tube is attached to a shoulder 52 incorporating an outlet nozzle 53. One end portion 54 of the tube 18 is heat treated and folded around the shoulder 54. The other end of the tube 18 is closed by a 'fish tail' type welded seam 55, after filling the tube 18.

The thin walled round tube 15 may also be shaped into a D-shaped cross-section flexible tube by the various apparatus shown in FIGS. 8–12.

Figure 9:
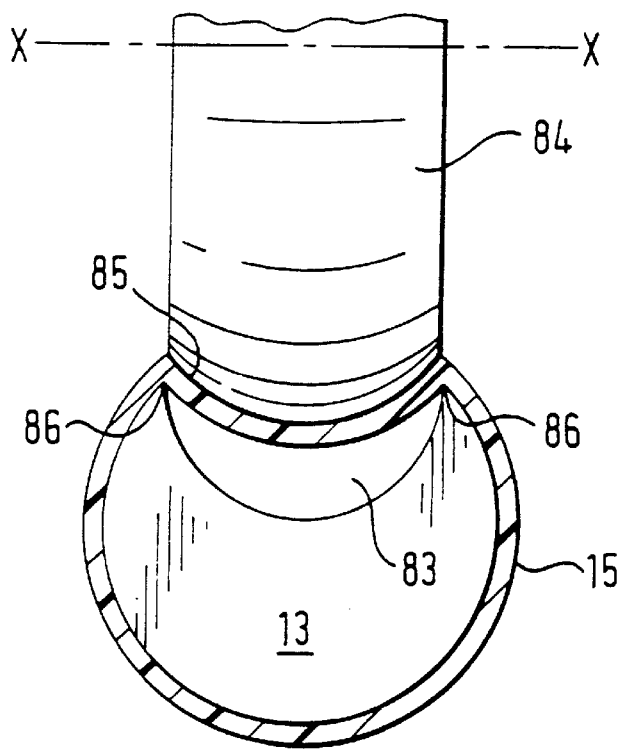
FIG. 9 is a front view of the apparatus of FIG. 8 with a tube being deformed thereon.

Now with reference to FIG. 8 and FIG. 9, the mandrel 13, or an additional add-on portion to the mandrel 13, has a generally circular body with a non-circular portion 13A having an elongated concave recess 83 formed in its outer surface. Aligned with the recess 83 is a forming roller 84 having an arcuate convex outer surface 85. Rotation of the roller 84 as the tube 15 advances, causes the tube wall to be compressed between the roller 84 and apices or shoulder edges 86 formed between the recess 83 and the generally circular body of the rest of the mandrel, forming a longitudinally extending crease as the tube 15 advances over the mandrel. The gap between the roller 24 and the apices 86 should be in the order of 0.175 mm. (0.007").

The roller 84 is rotated about its axis X by an electrical motor such that its linear surface speed is substantially equal to or slightly greater than the linear speed of the tube advance.

The D-shaped tube will then be cut to lengths as it emerges from the end of the mandrel portion 13A.

Figure 10:
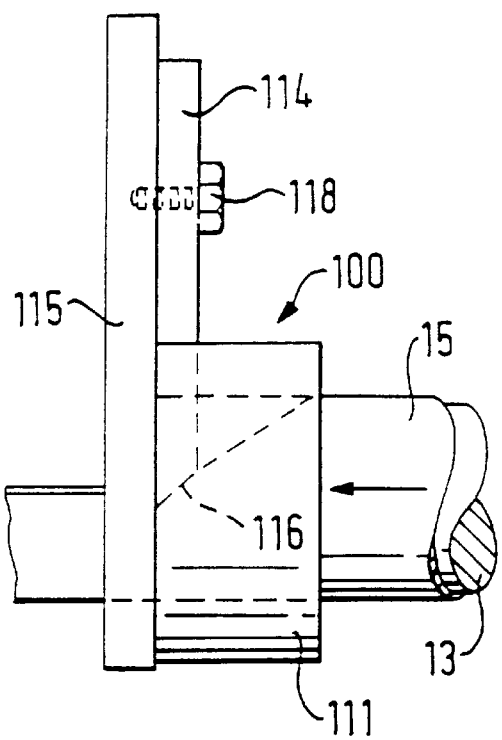
FIG. 10 is a side view of a second apparatus for making a D-shaped tube.
Figure 11:
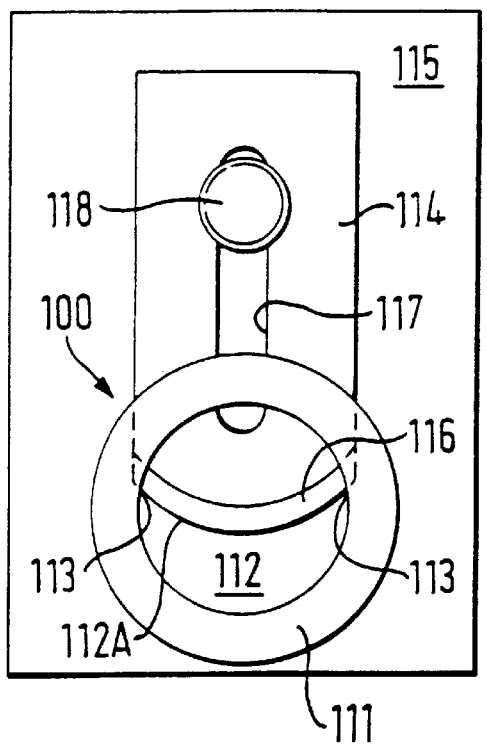
FIG. 11 is a front view of the apparatus shown in FIG. 10.

Another method of forming the tube 15 into a 'D' shape is shown in FIGS. 10 and 11. The round tube as it comes from the mandrel 13 is fed into a shaping die 100. The die orifice should have a peripheral length that is substantially equal to the circumference of the tube. The die 100 comprises a circular or cylindrical mouth 111 to feed the tube towards a crescent shaped die orifice 112 which has two acute angle corners 113, one for each longitudinal crease to be formed in the tube 15 as the round tube distorts to pass through the orifice 112. The upper edge 112A of the orifice 112 is formed on a transverse shutter 114 which is radially slidable relative to the mouth 111. The edge 112A has a convex arcuate shape and has a chamfer 116 in its leading face to help feed the tube into the orifice 112. Both the mouth 111 and shutter 114 are mounted on a back plate 115. The shutter 114 has an elongated slot 117 therein and is secured to the back plate 115 by a bolt 118 which clamps the shutter 114 to the back plate. The position of the shutter 114 can be adjusted relative to the mouth 111 to accommodate, for example, different thicknesses of tubes or tubes of different materials.

As the tube 15 is pulled through the orifice 112 the upper portion of the tube wall has two longitudinally extending creases formed therein to produce a D-shaped tube which is cut to length downstream of the shaping die 100.

Figure 12:
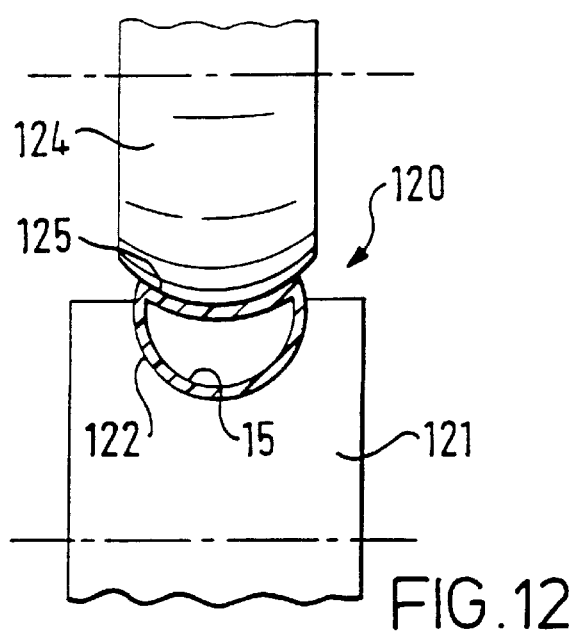
FIG. 12 is a front view of a third apparatus for making a D-shaped tube.

Yet another shaping apparatus 120 is shown in FIG. 12. This apparatus comprises two driven rollers 121 and 124. A first roller 121 has a shaped annular groove 122 formed in its outer circumferential surface and this groove accommodates a portion of the tube 15. A second roller 124, which counter rotates relative to the first roller 121, has a concave outer surface 125 thereon similar to that on the previously described forming roller 84. The second roller 124 compresses the upper portion of the tube 15 into the groove 122 and forms permanent creases at the edge of the groove 122 as described with reference to the shaped portion 13A of the mandrel 13.

Using any of the above-described three pieces of apparatus a 35 mm diameter tube 15 can be converted into a D-shaped tube 15A as shown in FIG. 7. The tube 15A has a chordal or flat portion 66 with a width of about 38 mm so that two D-shaped tubes when assembled together as shown in FIG. 7 can form a circular dual compartment container 70 having a diameter of approximately 38 mm.

With reference to FIGS. 6 and 7 there is shown a dual compartment container formed from the two D-shaped tubes 15A, each have a D-shaped shoulder piece 78 with a discharge nozzle 77 located at one end thereof to form a tubular housing. The two tubular housings are placed side-by-side with said one end portions being held together in a cap 76 which surrounds the D-shaped shoulder 78. The other end portions of the two tubes 15A form part of a fish tail closure seam 79 created after filling of the two tubular housings with their respective contents.

Whilst the invention has been described for use in the manufacture of D-shaped and square tubes it will be apparent that the apparatus and method can be adapted for making tubes and tubular housings having other cross-sectional shapes. For example the shaping die in FIGS. 10 and 11 could have a triangular shape.

I claim:

1. A method of manufacture of a non-round shaped cross-section flexible tube container, the method comprising the steps of:
   taking a flexible multilayer laminate plastics strip,
   forming said flexible plastics strip into a tube of substantially round cross-section by advancing said strip with respect to a mandrel and folding said strip around said mandrel,
   bringing the longitudinal edges of the strip gradually together and welding said edges together,
   passing the round cross-section tube directly to a creasing means, and
   creasing said round tube to form at least two spaced apart longitudinally extending creases in the wall of the tube by said creasing means acting on the external surface of the tube.

2. The method of claim 1, wherein the tube is creased by passing the tube between at least one pair of rollers.

3. The method of claim 2, wherein the rollers are shaped rollers and the method comprises the step of compressing portions of the tube between the rollers to form a crease while other portions of the tube remain in a substantially relaxed state.

4. The method of claim 3, for the formation of a tube having a D-shaped cross-section.

5. The method of claim 2, for the manufacture of a tubular container having a cross-section which is substantially polygonal the method comprising the steps of separately flattening said tube in at least two planes to form longitudinal fold creases corresponding to the corners of the polygonal cross-section.

6. The method of claim 5, wherein the polygonal cross-section has four sides, the method comprising the steps of flattening said tube in two mutually perpendicular planes.

7. The method of claim 6, wherein the two flattening operations are carried out by separate flattening means, the tube passing continuously from one flattening means to the other flattening means.

8. The method of claim 5, wherein the tube is compressed to a greater extent in one of said planes than in another of said planes.

9. The method of claim 8, the method involving first and second flattening operations, and wherein the fold creases formed by said first flattening operation are not directly compressed during said second flattening operation.

10. The method of claim 5, wherein the round cross-section tube is supplied as a continuous length of tube, and an end portion thereof is cut from said continuous length to produce a tube of a length corresponding to the desired length of a container, after the tube is flattened in at least one plane.

11. The method of claim 1, wherein the surface of the strip forming the external surface of the tube is scored to locate the crease at the score.

12. The method of claim 1, wherein the longitudinal edges of the strip are formed into an overlapping seam and the seam is off-set relative to the creases formed during the flattening process.

13. The method of claim 1, characterized in that the tube is creased whilst still on the mandrel.

14. The method of claim 1, wherein the round tube is drawn through a die having a plurality of acute angled corners, one corner per desired crease, and the creases are formed as the round tube distorts on passing through the die.

15. The method of claim 1, for the manufacture of a container for storage and delivery of paste-like products, the method comprising the further steps of:
   cutting a length of shaped tube having a length corresponding to the desired length of the container to be manufactured,
   welding into one end of said length of shaped tube an end cap having an outlet nozzle, and
   closing the other end of the shaped tube by bringing opposite faces of the tube together.

16. Apparatus for the manufacture of a non-round shaped flexible tube having at least two spaced apart longitudinally extending creases in the wall thereof, said apparatus comprising:
   folding means for folding an advancing flat strip of plastics material around a mandrel so that the longitudinal edges of the strip are brought together, welding means for welding said longitudinal edges together to form a substantially round flexible tube, transport means for passing the round tube directly to a creasing means, and said creasing means for acting on the external surface of the round tube to form said at least two longitudinal extending creases on the surface thereof.

17. The apparatus of claim 16, for the manufacture of D-shaped tubes, wherein the creasing means comprises a pair of rollers, one of said rollers having a recess in its outer surface shaped to receive a portion of the round tube, and the other of said rollers having a surface shaped to crease the wall of the tube between the two rollers.

18. The apparatus of claim 16, for the manufacture of a substantially rectangular cross-section tube, wherein the creasing means comprises two pairs of parallel rollers between which the tube passes to be flattened, the axes of one pair of rollers being aligned transverse to the axes or the other paid of rollers.

19. The apparatus of claim 18, wherein the two pairs of rollers comprise an upstream pair of substantially upright rollers and a downstream pair of substantially horizontal rollers.

20. The apparatus of claim 19, wherein at least one roller of the downstream pair of rollers has a reduced diameter central portion having a width just less than the width of the flattened tube.

21. The apparatus of claim 20, wherein each of the downstream pair of rollers has a circumferential groove therein, for receiving an edge of the flattened tube advancing from the upstream pair of rollers.

22. The apparatus of claim 18, wherein the axes of the two pairs of rollers are spaced apart such that the distance between the plane containing one pair of axes and the plane containing the other pair of axes is a minimum of about 3 times the nominal diameter of the round tube.

23. The apparatus of claim 18, wherein the two pairs of rollers are mounted on a support body which can be secured to the output of a tube manufacturing plant, so that the round tube is converted to tube of rectangular cross-section as it is produced, without the need for intermediate storage.

24. The apparatus of claim 18, wherein at least one roller of at least one of said pairs of rollers has at least one raised circumferentially extending bead thereon for forming a crease in one part of the sidewall of the tube of rectangular cross-section.

25. The apparatus of claim 16, further including a scoring means for longitudinally scoring the external surface of the round tube to locate the creases.

26. The apparatus of claim 16, wherein the creasing means comprises a die having a plurality of acute angled corners, there being one corner per desired crease, and the creases are formed as the round tube distorts to pass through the die.

27. The apparatus of claim 16, wherein the creasing means comprises a mandrel having a portion of non-circular shape, over which the tube is advanced so that the tube completely surrounds the mandrel, and at least one roller having an axis of rotation spaced from the mandrel so that the outer surface of the roller compresses the advancing tube against said non-circular portion of the mandrel.

* * * * *